United States Patent [19]

Beveridge, Jr.

[11] Patent Number: 4,837,908
[45] Date of Patent: Jun. 13, 1989

[54] ROLL ASSEMBLY FOR FIBER DRAFTING MACHINE

[75] Inventor: Hugh K. Beveridge, Jr., Gastonia, N.C.

[73] Assignee: Du Pont de Nemours & Co., Wilmington, Del.

[21] Appl. No.: 212,669

[22] Filed: Jun. 28, 1988

Related U.S. Application Data

[63] Continuation-in-part of Ser. No. 878,703, Jun. 26, 1986, abandoned.

[51] Int. Cl.$^4$ ............................................. B21B 27/00
[52] U.S. Cl. ......................................... 29/130; 29/132
[58] Field of Search ................. 29/130, 132, DIG. 25, 29/149.5 C, 149.5 NM, 123; 384/907, 908, 909; 19/49

[56] References Cited

U.S. PATENT DOCUMENTS

| | | | |
|---|---|---|---|
| 2,246,086 | 6/1941 | Austin | 384/909 |
| 2,246,092 | 6/1941 | Gilman | 384/909 |
| 2,775,793 | 1/1957 | Cotchett | 29/132 |
| 2,778,664 | 1/1957 | Herbenar | 287/85 |
| 2,937,414 | 5/1960 | Cotchett | 29/116 R |
| 3,228,088 | 1/1966 | Schaeffler et al. | 29/116 |
| 3,390,927 | 7/1968 | Adams | 308/135 |
| 3,566,497 | 3/1971 | Hamlen | 29/132 |
| 3,647,751 | 3/1972 | Darsow | 384/909 |
| 3,996,143 | 12/1976 | Orkin et al. | 364/909 |
| 4,037,299 | 7/1977 | Smith | 29/130 |
| 4,421,588 | 12/1983 | Davies | 29/149.5 NM |
| 4,440,295 | 4/1984 | Blackwood-Murray et al. | 29/132 |

OTHER PUBLICATIONS

Brochure No. E-61482, (3/85), published by Du Pont Company.

Primary Examiner—Mark Rosenbaum
Assistant Examiner—Irene Cuda
Attorney, Agent, or Firm—Donald W. Huntley

[57] ABSTRACT

A roll assembly (50) for a fiber drafting machine is positioned on a spindle (51). First and second locking collars (52), (53) on spindle (51) define a space within which is positioned a pair of bearings (40). An annular bearing sleeve (55) is positioned in bearing contact with bearings (40). Bearing sleeve (55) includes a bore (56) from one end to the other which includes a stepped portion (57) defining two spaced-apart shoulders (58), (59). Flange (42) of the two bearings (40) seat flush against the innermost surface of locking collars (52), (53). A flange edge (45) of each of the bearings (40) is positioned in bearing contact with the inner walls of bearing sleeve (55) defining bore (56) to provide a radial bearing surface. Shoulders (58) and (59) abut and bear against shoulder (44) of flange (42) of bearings (40) and provide a thrust bearing surface along the axial length of spindle (51). Bearing (40) is preferably formed of a plastic resin, such as polyimide having a low coefficient of friction and a high temperature resistance. Bearing (40) is integrally formed by compression molding of a suitable resin powder, injection molding, or by machining.

16 Claims, 3 Drawing Sheets

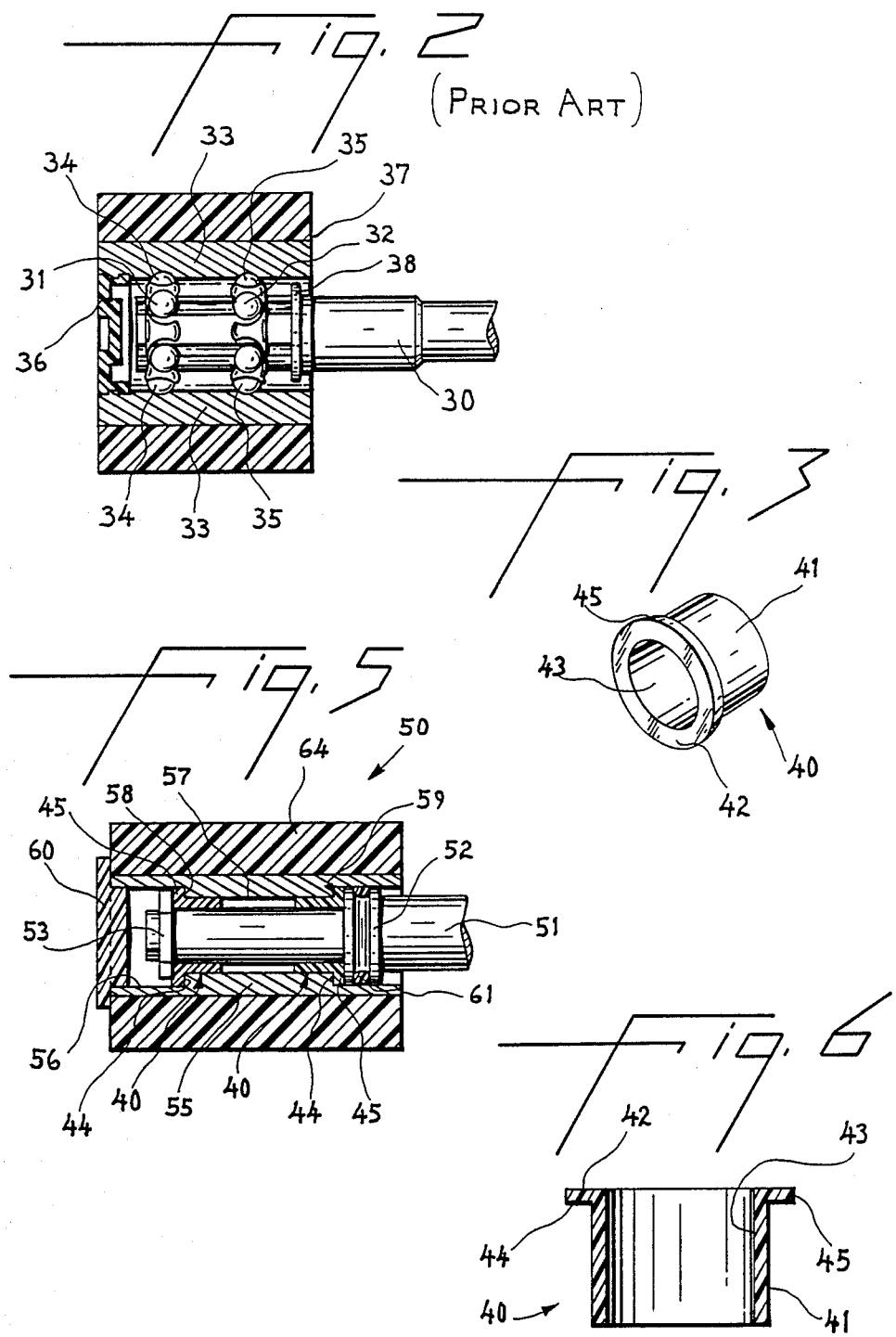

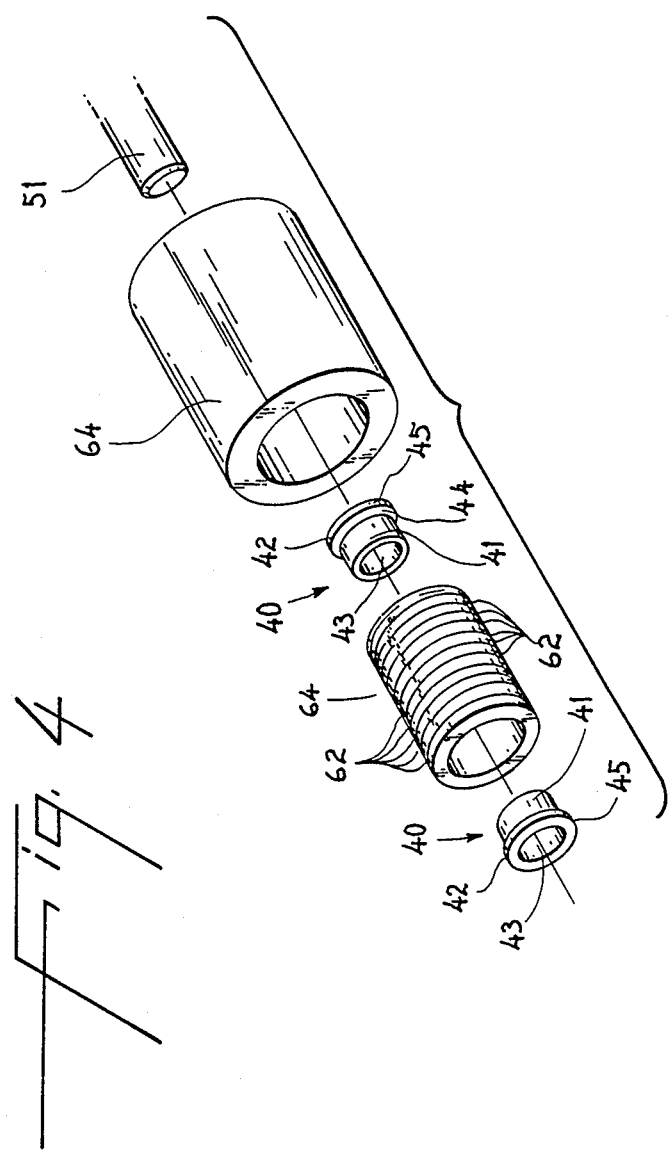

ROLL ASSEMBLY FOR FIBER DRAFTING MACHINE

CROSS-REFERENCE TO RELATED APPLICATION

This is a continuation-in-part of application Ser. No. 878,703, filed June 26, 1986, now abandoned.

BACKGROUND OF THE INVENTION

This invention relates to a roll assembly for a fiber drafting machine such as a roving or spinning frame. These machines are used in the processing of staple fibers of either natural or synthetic origin into spun yarn. As processing of the fiber takes place, the strand is greatly increased in length and decreased in size by passing the strand through a plurality of rolls. In a conventional ring spinning frame, for example, the strand is passed between a pair of top rolls which are weighted so that they have a definite grip on the strand. The middle rolls (or aprons) are driven at a slightly greater surface speed than the back rolls, causing fibers within the strand to be longitudinally displaced relative to each other. A pair of front rolls move at a surface speed much greater than either the middle or back rolls, causing the strand to be reduced to a much finer size. Twisting of the strands takes place as drafting occurs so that the finished yarn product has a suitable amount of twist for its end use.

In the past, yarn processing took place at relatively slow speeds. However, in recent years the rapid increase in the cost of labor and the simultaneous increase in the speed and sophistication of roving and spinning frames has greatly increased the mechanical stress on the drafting rolls.

Typically roller bearings, such as ball or needle bearings, have previously been used in spinning and roving frame drafting rolls. When operated at relatively low speeds and under relatively low stress conditions, ball bearings perform adequately with relatively infrequent lubrication. However, greater speed and operating stress significantly increase the frequency of bearing failure and, in addition, substantially increase the frequency with which routine maintenance such as cleaning and lubrication must be performed. Even at modern, high production rates, yarn production from a single position on a spinning frame is relatively low. For this reason, the typical yarn mill may have several hundred frames, each having a hundred or more positions. Since each position has several sets of rolls, each of which have two roll assemblies, the number of bearings which must be regularly lubricated and cleaned is significant. The amount of labor required to perform these routine tasks can detract significantly from the efficiencies received from higher production rates.

In addition to the labor involved in lubricating bearings, the presence of a lubricant itself is inherently undesireable, since the lubricant, if it leaks from the bearing, can soil the yarn being processed, and, within bearing, can attract lint which interferes with bearing performance.

Low friction materials such as tetrafluoroethylene and polyimide materials have previously been used for making seals, gaskets, valve seats, insulators, bearings, bushings, piston rings, washers, wear strips and similar items. This type of product is commercially available from E. I. du Pont de Nemours and Company as VESPEL ® polyimide and from Rogers Corporation as INVEX ® polyimide. Structures can be prepared from such materials by either compression molding the resin powder, or machining preformed shapes on standard metal-working equipment in much the same manner as brass. Products such as polyimide resin are characterized by a low natural coefficient of friction without secondary lubrication, good wear resistance, continuous operation at temperature ranges between cryogenic to over 500° F. (288° C.).

SUMMARY OF THE INVENTION

The present application relates to a roll assembly which includes the use of bearings formed of the above-described resins, among others. The bearings exhibit substantially greater service life between maintenance cycles and replacement than conventional steel ball, needle or roller bearings. In addition, the bearings eliminate the need for lubricants such as grease, are less expensive to manufacture and contain substantially fewer parts than conventional bearing constructions. The present roll assembly also provides a bearing which is a single, integral structure which acts as both a radial and thrust bearing.

Specifically, the present invention provides a roll assembly for a fiber drafting machine having an elongate spindle with first and second rolls mounted for rotation on opposite ends of the spindle, each of the first and second rolls comprising:

(a) first and second locking collars mounted on the spindle in spaced-apart relation;

(b) first and second bearings formed of a low friction, high temperature resin and mounted for rotation on the spindle in spaced-apart relation within the space defined by the first and second spaced-apart locking collars, each of the bearings comprising an annular ring of a relatively small diameter and an integrally-formed concentric flange of increased diameter thereon; and (c) an annular bearing sleeve mounted on the spindle for receiving an elastic cover; the bearing sleeve having inner support surface portions complementary to the shape of the first and second bearings in bearing contact with the small diameter annular ring of the first and second bearings in the radial direction, and in bearing contact with the increased diameter flange in the axial (thrust) direction, whereby the first and second bearings each provide a radial and thrust bearing function to the roll assembly.

BRIEF DESCRIPTION OF THE DRAWINGS

FIG. 2 is a partial cross-sectional view of a prior art roll assembly for a fiber drafting machine;

FIG. 3 is a perspective view of a bearing used in a roll assembly according to the present invention;

FIG. 4 is an exploded view of a roll assembly according to the present invention;

FIG. 5 is a partial cross-sectional view of an assembled roll assembly according to the present invention; and FIG. 6 is a cross-sectional view along the rotational axis of the bearing shown in FIG. 3.

DETAILED DESCRIPTION OF THE INVENTION

Figure 1:
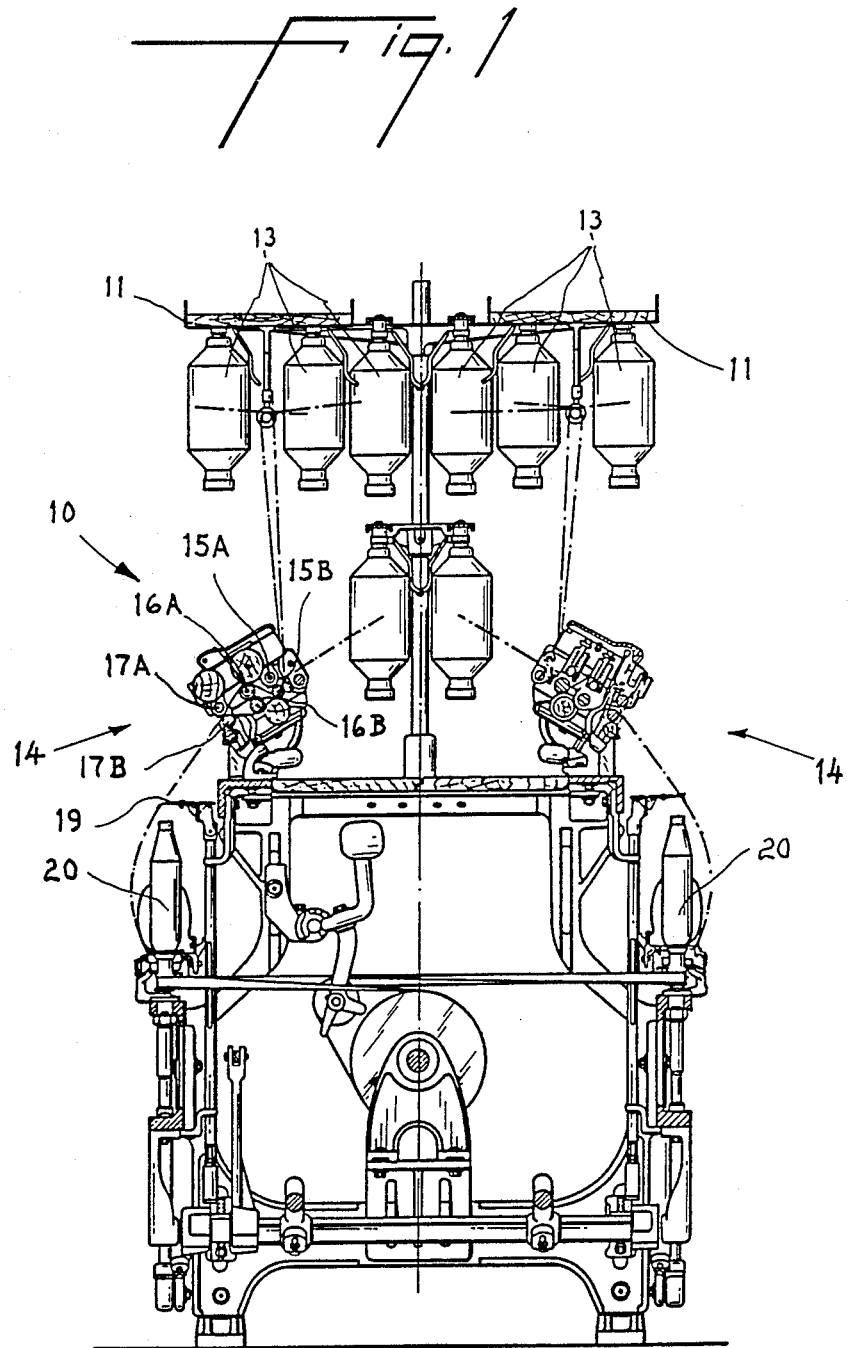
FIG. 1 is a partial vertical cross-section through a ring spinning frame of the general type on which a drafting roll assembly according to the present invention is utilized.

The bearings of the present invention can be formed of resin such as polyimide, polyetherketone (PEK), polyethersulfone (PES), poly(amide-imide), or other engineering polymeric materials with a suitable tensile characteristics and coefficient of friction. The performance characteristics of polyimides are particularly well suited to the preparation of the bearings used in the present invention, and are accordingly particularly preferred.

Preferably, the bearings have a coefficient of friction of between 0.10 and 0.30. In a preferred embodiment of the invention, the first and second bearings are opposed with the flange of the respective bearings positioned remote from each other in contact with the respective locking collars.

Referring now specifically to the drawings, a ring spinning frame of the type on which a roll assembly according to the present invention would be used is shown in FIG. 1. The spinning frame there shown is merely illustrative of the wide variety of fiber drafting machines which use drafting rolls and on which a roll assembly according to the present invention can be used.

In FIG. 1, spinning frame 10 generally comprises an umbrella creel on which are suspended a plurality of roving bobbins 13. Yarn is drafted in the drafting area 14 of spinning frame 10 by passing the yarn between pairs of drafting rolls 15A, 15B; 16A, 16B; and 17A, 17B. Roving passes from the roving bobbins 13 through the drafting zones between the respective pairs of drafting rolls and through a pigtail guide 19 onto a yarn bobbin 20. Each drafting roll has two roll assemblies, one on either end. A length of spindle between the two roll assemblies is used as a bearing surface and is typically weighted or spring loaded. The downward pressure on the central portion of the spindle is transferred laterally to the roll assemblies on either end of the spindle.

In FIG. 2, one roll assembly according to the prior art is shown. The actual construction of a drafting roll, in use, also comprises a roll assembly such as is shown in FIG. 2 on the other end of the spindle.

Still referring to FIG. 2, the prior art form of roller bearing conventionally used in roll assemblies on fiber drafting machines comprises a spindle 30 having two spaced-apart bearing races (not shown) on which are positioned two spaced-apart sets of ball bearing assemblies 31 and 32. Ball bearing assemblies 31 and 32 are held in position by a bearing sleeve 33 in which is formed outer bearing races 34 and 35. The space inside bearing sleeve 33 occupied by ball bearing assemblies 31 and 32 is sealed by end caps 36 and 38 and packed with lubricating oil or grease. Bearing sleeve 33 is covered with a relatively thick plastic or rubber 37 which provides a cushioning wear surface and also a relatively high friction surface which grips the strand as drafting takes place. Even when tightly sealed, minute fibers which are always present in the environment immediately surrounding the roll assemblies tend to migrate into the area occupied by ball bearing assemblies 31 and 32. Other contaminants, such as metal fragments from the bearings and cases, also eventually degrade the ball bearing assemblies 31 and 32 and the lubricant, requiring disassembly and replacement, or resulting in failure of the entire assembly. Wear on the ball bearing assemblies 31 and 32 and on bearing sleeve 33 is accentuated because, as described above, force on the roller assemblies 31 and 32 is created by downward pressure on the spindle 30 intermediate to spaced-apart roller assemblies. Therefore, the downward pressure on the roller assemblies is asymmetric and causes uneven loading and wear of the roller assembly and its constituent parts.

Many of these problems are reduced or eliminated altogether by the use of a bearing 40 such as shown in FIG. 3. Bearing 40 is either compression molded of a suitable resin powder, injection molded, or is machined from tubular stock of the same material. Bearing 40 comprises an elongate annular ring portion 41 and an integrally formed concentric flange 42 having an increased outer diameter. A throughbore 43 of uniform internal dimensions permits bearing 40 to be placed on a spindle 51. As is best explained by simultaneous reference to FIGS. 3 and 6, flange 42 includes a radially extending shoulder 44 at right angles to the outer surface of the annular ring portion 41, and an axially extending edge surface 45 parallel to the outer surface of annular ring portion 41 and perpendicular to radially extending shoulder 44. As is also shown best in FIGS. 3 and 6, flange 42 is preferably formed flush with one end of annular ring portion 41.

A summary of typical properties of a polyimide resin of the type suitable for fabrication of bearing 40 is shown in the following table.

| Property | Method | (°F.) Temp | Units | 1* | 2* | 3* | 4* | 5* |
|---|---|---|---|---|---|---|---|---|
| Tensile Strength, Ultimate | ASTM D-638 | 73 500 | PSI PSI | 12500 6000 | 9500 5500 | 7500 3400 | 6500 3500 | 8200 — |
| Elongation Ultimate | ASTM D-638 | 73 500 | % % | 7.5 7.0 | 4.5 2.5 | 3.0 2.5 | 3.5 3.0 | 4.0 — |
| Flexural Modulus | ASTM D-790 | 73 500 | $10^3$ PSI $10^3$ PSI | 450 250 | 550 370 | 700 400 | 450 200 | — — |
| Compressive Modulus | ASTM D-695 | 73 | $10^3$ PSI | 350 | 420 | 475 | 300 | — |
| Wear Rate PV = 25,000 | Unlub. | | in/1000 hrs | .25–1.2 | .09 | .06 | .07 | .25–.33 |
| Friction Coefficient | Unlub. | | | | | | | |
| Dynamic | | | | .29 | .24 | .20 | .12 | .25 |
| Static | | | | .35 | .30 | .27 | .20 | — |
| Static in Vacuum | | | | — | — | — | — | .03 |
| Coefficient of Linear Expansion | E-228 | 73–572 | $10^{-6}$ in/in/°F. | 30 | 27 | 21 | 30 | — |

-continued

| Property | Method | (°F.) Temp | Units | 1* | 2* | 3* | 4* | 5* |
|---|---|---|---|---|---|---|---|---|
| Dielectric Constant | D-150 | 73 | @ 10⁴ Hz | 3.64 | 13.28 | — | — | — |

Underwriters Laboratory Flame Rating: 94-VO
*1 - Unfilled base resin
*2 - Base resin with 15% graphite by weight
*3 - Base resin with 40% graphite by weight
*4 - Base resin with 10% Teflon ® resin and 15% graphite by weight
*5 - Base resin with 15% molybdenum disulfide by weight The properties described above are for machined parts. Properties typical of other manufacturing processes such as compression molding from the resin powder may vary. For example, the coefficient of linear expansion of direct-formed parts can be 7% to 24% less than the values shown above, depending upon the resin composition. It has been determined through experimentation that composition No. 2 listed above which includes 15% graphite by weight added to the base resin, and composition No. 4 which includes both 10% tetrafluoroethylene resin and 15% graphite by weight added to the base resin are particularly suitable for use as a material for bearing 40. By incorporation of bearing 40 into the roll assembly according to the present invention, an inexpensive and extremely long wearing construction is provided.

Referring now to FIG. 5, a roll assembly 50 according to the present invention is shown and includes a spindle 51. A single roll assembly 50 on spindle 51 is shown in FIG. 5. In actual use, the spindle is significantly longer than shown in FIG. 5 with another roll assembly 50 on the other end.

First and second locking collars 52 and 53 are positioned on spindle 51 and define a space within which is positioned a pair of bearings 40. Collar 52 may be pressed on, or made integrally with the spindle. As is shown, bearings 40 are oriented so that the flanges 42 face outwardly in contact with locking collars 52 and 53, respectively. The bore 43 in bearings 40 is sized to a close but nevertheless freely rotatable fit with the portion of spindle 51 between locking collar 52 and locking collar 53.

An annular bearing sleeve 55 is positioned in bearing contact with the two spaced-apart bearings 40. As is shown by continued reference to FIG. 5, bearing sleeve 55 includes a bore 56 from one end to the other which includes a stepped portion 57 defined by thickened side walls. The stepped portion 57 defines two spaced-apart shoulders 58 and 59. Flanges 42 are seated flush against the innermost surface of the respective locking collars 52 and 53. The flange edge 45 of each of the two bearings 40 is positioned in bearing contact with the inner walls of bearing sleeve 55 defining bore 56 to provide a radial bearing surface. The shoulders 58 and 59 abut and bear against the shoulder 44 of flange 42 of the respective bearings 40 and provide a thrust bearing surface along the axial length of spindle 51. Therefore, the simple construction of bearing 40 provides a bearing surface in two directions, radial and axial (thrust), thereby serving the same function in a much simpler manner than the prior art ball bearings and associated inner and outer races.

The bearing is sealed against lint and debris by end cap 60 and seal 61, the seal being positioned in the groove of locking collar 52. The end cap can be formed from any suitable injection molding resin, such as a polyethylene or polyamide. The seal can be prepared from any suitable elastomeric material, and is conveniently installed in the form of an "O" ring.

As is shown in FIG. 4, bearing sleeve 55 is provided with a plurality of circumferentially extending grooves 62. An elastic cover 64 is pressed onto bearing sleeve 55. The elasticity of elastic cover 64 fits into the grooves 62 somewhat, providing an interference fit between the outer surface of bearing sleeve 55 and elastic cover 64, and are bonded together with rubber and/or phenolic based adhesive.

A roll assembly for a fiber drafting machine is described above. Various details of the invention can be changed without departing from its scope. Furthermore, the foregoing description of the preferred embodiment of a roll assembly for a fiber drafting machine according to the present invention is provided for purposes of illustration only and not for the purpose of limitation, the invention being defined by the following claims.

I claim:

1. A roll assembly for a fiber drafting machine having an elongate spindle with first and second rolls mounted for rotation on opposite ends of the spindle, each of the first and second rolls comprising:
    (a) first and second locking collars mounted on the spindle in spaced-apart relation;
    (b) first and second bearings formed of a low friction, high temperature resin and mounted for rotation on the spindle in spaced-apart relation within the space defined by the first and second spaced-apart locking collars, each of the bearings comprising an annular ring of a relatively small diameter and an integrally-formed concentric flange of increased diameter thereon, the flange on each of the first and second bearings being respectively adjacent to the first and second locking collars; and
    (c) an annular bearing sleeve mounted on the spindle for receiving an elastic cover; the bearing sleeve having inner support surface portions complementary to the shape of the first and second bearings in the radial direction, and in bearing contact with the increased diameter flange in the axial direction, whereby the first and second bearings each provide a radial and thrust bearing function to the roll assembly.

2. A roll assembly according to claim 1, wherein the flange of the bearing is formed flush with one end of the annular ring.

3. A roll assembly according to claim 1, wherein the bearing comprises polyetherketone (PEK).

4. A roll assembly according to claim 1, wherein the bearing comprises polyethersulfone (PES).

5. A roll assembly according to claim 1, wherein the bearing comprises polyimide.

6. A roll assembly according to claim 1, wherein the bearing comprises poly(amide-imide).

7. A roll assembly according to claim 1, wherein the bearing surface has a coefficient of friction of about from 0.10 and 0.30.

8. A roll assembly according to claim 1, wherein the first and second bearings are opposed within the flange of its respective bearing and positioned in contact with the respective locking collar.

9. A roll assembly for a fiber drafting machine having an elongate spindle with first and second rolls mounted for rotation on opposite ends of the spindle, each of the first and second rolls comprising:
 (a) first and second locking collars mounted on the spindle in spaced-apart relation;
 (b) first and second bearings formed of a low friction, high temperature resin and mounted for rotation on the spindle in spaced-apart relation within the space defined by the first and second spaced-apart locking collars, each of the bearings comprising an annular ring of a relatively small diameter and an integrally-formed concentric flange of increased diameter thereon, the flange on each of the first and second bearings being respectively adjacent to the first and second locking collars; and
 (c) an annular bearing sleeve mounted on the spindle for receiving an elastic cover; the bearing surface comprising an elongate tube, the outer walls of which define a cylinder and the inner walls of which define two spaced-apart bores of relatively large diameter separated by a connecting bore having a relatively smaller diameter defined by thicker bearing sleeve side walls, the points of juncture between the relatively large diameter portions and the intermediate smaller diameter portion defining shoulder having a cross-section complementary to the shape of the first and second bearings, the relatively large diameter portions of the bore through the bearing sleeve being of a size to rotatably accommodate the flange of the bearing and the relatively smaller diameter portion being of a size to matingly contain the small diameter annular portion of the bearings.

10. A roll assembly according to claim 9, wherein the flange of the bearing is formed flush with one end of the annular ring.

11. A roll assembly according to claim 9, wherein the bearing comprises polyetherketone (PEK).

12. A roll assembly according to claim 9, wherein the bearing comprises polyethersulfone (PES).

13. A roll assembly according to claim 9, wherein the bearing comprises polyimide.

14. A roll assembly according to claim 9, wherein the bearing comprises poly(amide-imide).

15. A roll assembly according to claim 9, wherein the bearing surface has a coefficient of friction of between 0.10 and 0.30.

16. A roll assembly according to claim 9, wherein the first and second bearings in each roll are opposed, with the flange of each bearing positioned in contact with the corresponding locking collar.

* * * * *